United States Patent [19]

Ogden

[11] 4,214,153
[45] Jul. 22, 1980

[54] TAPE AND TAPE READER ARRANGEMENT FOR PROGRAMMABLE CONTROLLERS

[76] Inventor: Ralph Ogden, 1304 Fisher St., Munster, Ind.

[21] Appl. No.: 932,475

[22] Filed: Aug. 10, 1978

Related U.S. Application Data

[63] Continuation-in-part of Ser. No. 779,579, Mar. 21, 1977, abandoned.

[51] Int. Cl.² .................. G06K 7/06; G06F 15/46; G09C 1/00; G09B 23/00
[52] U.S. Cl. .......................... 235/376; 35/2; 35/48 B; 235/441; 235/443; 235/445
[58] Field of Search ............. 235/441, 442, 376, 492, 235/444, 445, 446, 420; 35/2, 48 B; 234/79; 250/568, 569; 340/149 A, 152

[56] References Cited

U.S. PATENT DOCUMENTS

| | | | |
|---|---|---|---|
| 2,171,556 | 9/1939 | Higginbottom | 235/492 |
| 2,377,783 | 6/1945 | Hood | 235/441 |
| 2,690,301 | 9/1954 | Wilson | 235/441 |
| 2,835,206 | 5/1958 | Gordon | 104/88 |
| 2,857,687 | 10/1958 | Erdman | 35/2 |
| 2,930,941 | 3/1960 | Neidenberg | 317/139 |
| 2,941,054 | 6/1960 | Willis | 200/46 |
| 3,002,115 | 9/1961 | Johnson | 307/149 |
| 3,035,764 | 5/1962 | Beman | 235/432 |
| 3,048,327 | 8/1962 | Gewickey | 235/441 |
| 3,228,001 | 1/1966 | Herzl | 340/149 |
| 3,321,774 | 5/1967 | Jensen | 340/163 |
| 3,412,237 | 11/1968 | Brothman | 235/445 |
| 3,418,728 | 12/1968 | Couceyro | 35/2 |
| 3,424,879 | 1/1969 | Shlesinger | 200/61.14 |
| 3,457,641 | 7/1969 | Watson | 235/492 |
| 3,576,430 | 4/1971 | Fickenscher | 235/437 |
| 3,597,593 | 8/1971 | Stanesby | 340/147 MT |
| 3,602,696 | 8/1971 | Joyce | 35/2 |
| 3,643,348 | 2/1972 | Azure | 35/48 B |
| 3,769,552 | 10/1973 | Cook | 317/112 |
| 3,868,057 | 2/1975 | Chavez | 235/443 |
| 3,918,633 | 11/1975 | Maurer | 235/453 |
| 3,961,164 | 6/1976 | Reed | 235/495 |

OTHER PUBLICATIONS

3,982,102 09001976 Cidade 235 61.6 E
Donald Henry "Sequential Approach Simplifies PLC Programming"; Control Engineering, Mar. 1976, pp. 83–84.

*Primary Examiner*—Robert M. Kilgore
*Attorney, Agent, or Firm*—McWilliams, Mann & Zummer

[57] ABSTRACT

A tape and tape reader for industrial process programmable controller systems in which the I/O functions for process steps have been laid out in sequentially consecutive binary notation fashion computer data word form, in the order of sequence of the process steps, in accordance with which the tape is a ribbon that is delineated to have applied to same the computer data word indicia in modularized group or set form, in which groups or sets the computer data words for the consecutive process steps are sequentially arranged transversely of the tape, with succeeding groups or sets following in sequential order, wherein the computer data word indicia is manually marked on the tape binary notation system fashion, with electrically conductive marking material, and the reader is formed for pull through application of the tape therethrough and includes an electrical contact arrangement for electrically sensing the tape markings in consecutive word group or set form, with continuous manually induced movement of the tape through the reader, for storing of the computer word sets in the controller memory for controlling the process through the controller central processing unit.

21 Claims, 10 Drawing Figures

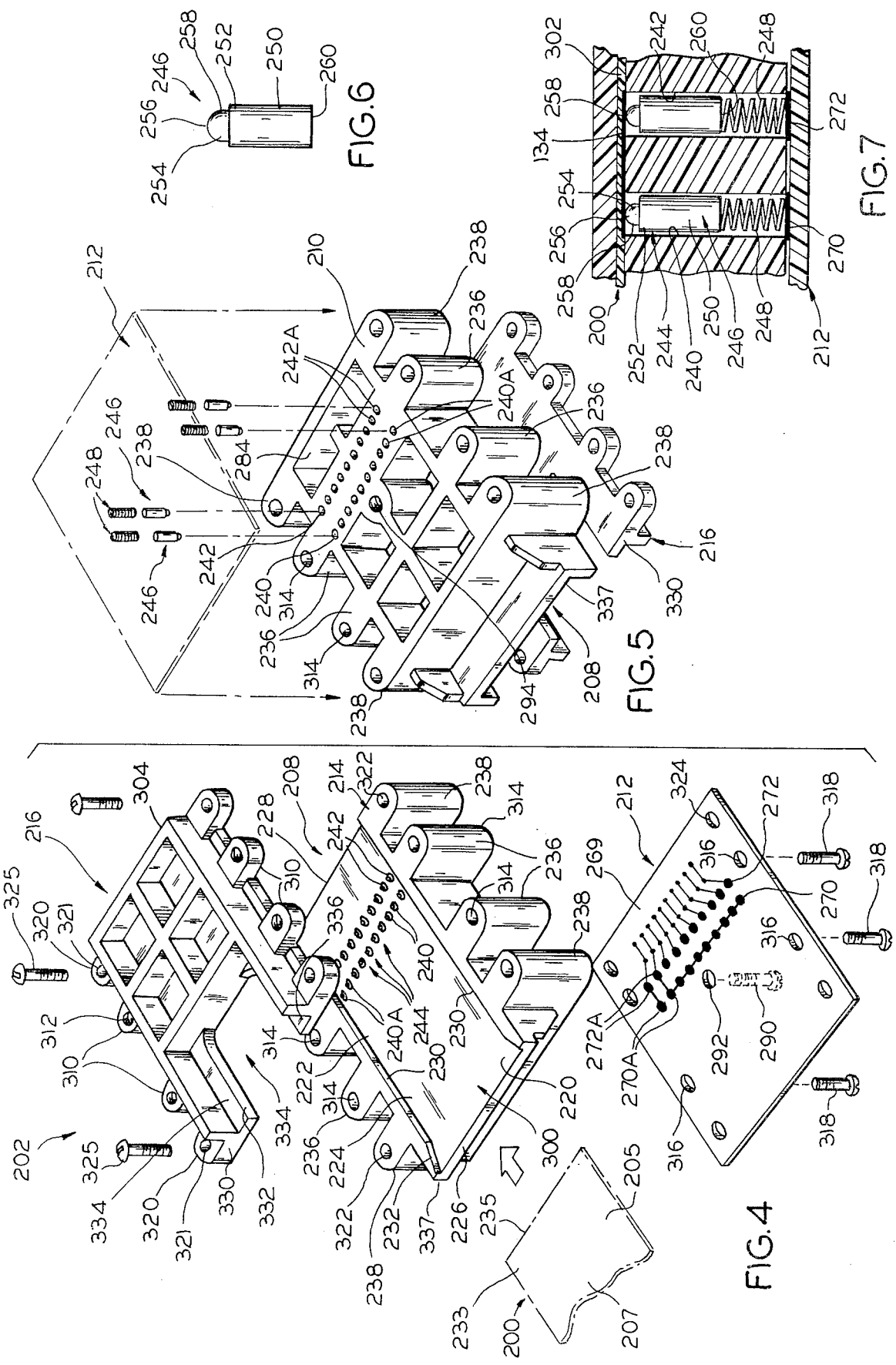

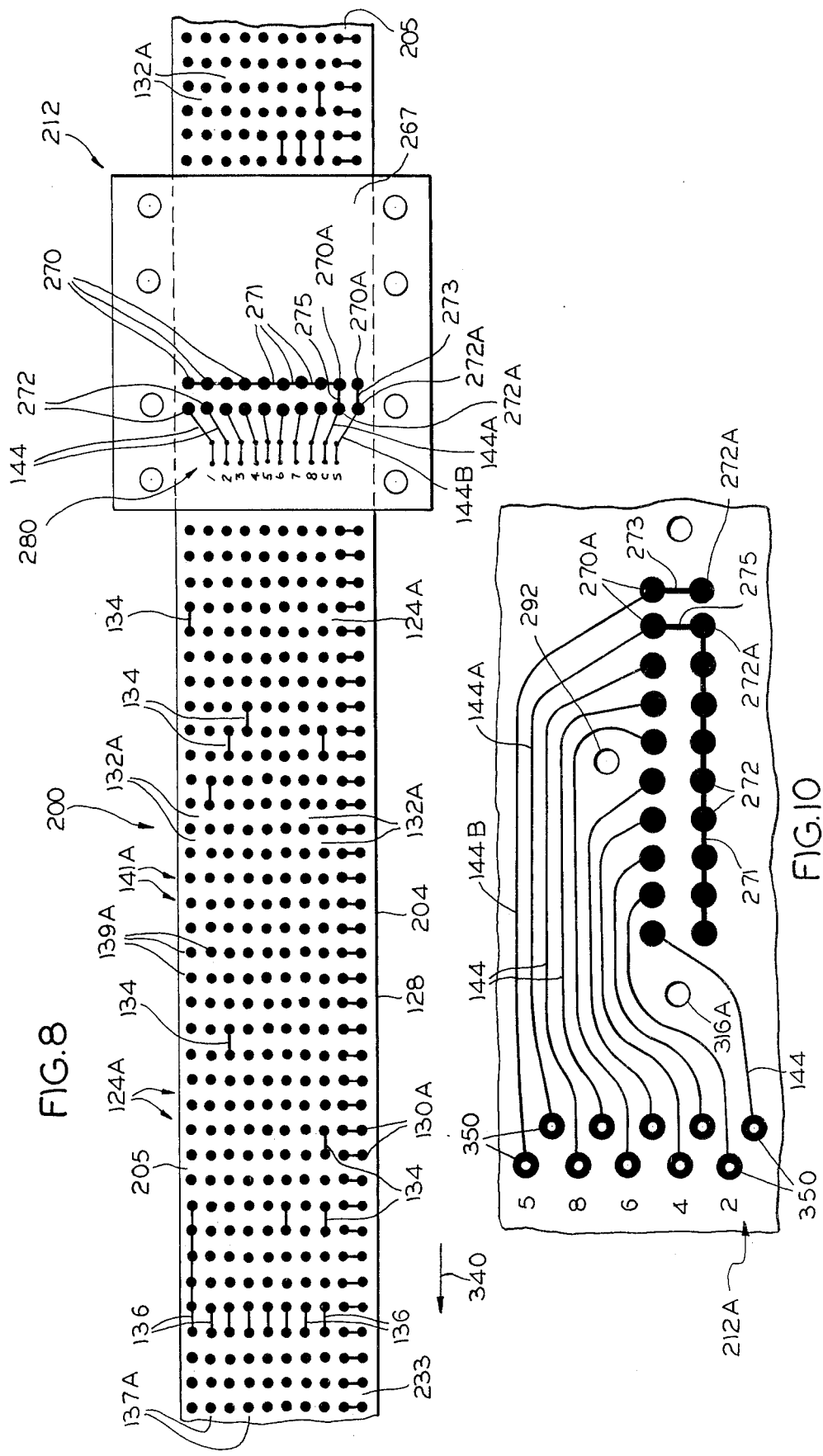

TAPE AND TAPE READER ARRANGEMENT FOR PROGRAMMABLE CONTROLLERS

This application is a continuation-in-part of my now abandoned prior copending application Ser. No. 779,579, filed Mar. 21, 1977, the entire disclosure of which is hereby incorporated herein by this reference. My application Ser. No. 963,415, filed Sept. 24, 1978 is a continuation-in-part of my said application Ser. No. 779,579 and the instant application.

Programmable controllers have come into common use in recent years to avoid the need of using traditional electromechanical relay logic circuitry of the older forms of industrial process control systems.

A typical programmable controller consists of one or more input modules, one or more output modules, one or more memory modules, and a processor, usually referred to as the central processing unit. The input module converts the status condition of the process variables into electrical signals that can be understood by the programmable controller. The output module converts the commands issued by the central processing unit into signals that can actuate or deactuate corresponding machine devices; it usually consists of solid state switches operated through the output interface to control power to the desired external devices.

The memory module contains the instructions that represent the systems control circuitry and the action that is to be taken in response to each condition of the input devices. Various memory types, as well as methods to prepare and insert the instructions that are employed by the programmable controller manufacturers, are available.

The central processing unit supervises the other sections of the system. Typically, the processor performs logical comparisons on the inputs and outputs in response to instructions in its memory, and it energizes or deenergizes outputs as a result of these comparisons.

More recently, LSI (large scale integration) devices have been devised in extremely small size to perform the functions of the central processing unit; these have become generally known as microprocessors. Typically, the microprocessor is contained on a single IC (integrated circuit) chip, though in some cases the microprocessor is made up of two, three or even more, such chips.

Prior to the invention disclosed in my above identified prior application, the programming of microprocessors was commonly done by way of the familiar ladder diagram, which is entered into the controller through a variety of formats. A common data entry format is the CRT (cathode ray tube display) used as an accessory to the keyboard terminal, which provides a full alphanumeric and special function keyboard. The CRT allows one to see the ladder diagram as interpreted by the controller, and the alphanumeric keyboard provides for a large range of special notations, comments, and notes.

In addition to the ladder diagram form of entry, the programmer can also program with Boolean algebraic equations and assembly language. The Boolean form is the mathematical expression of the ladder diagram, and assembly language is simply the language the microprocessor uses to communicate.

A major disadvantage inherent in conventional programmable controllers has been the need to have available the services of a highly trained programmer familiar with ladder diagram technology. Further, since conventional systems without battery back up may lose their data base should there be an electrical shut down, and restoration of the data base frequently involves time consuming procedures requiring the services of the highly specialized programmer before production can be resumed.

In accordance with the invention of my above identified prior application, a programmable controller system, apparatus, and method, for controlling industrial processes, are provided including a central processing unit provided with a random or other access memory including an instruction register, a tape reader for sensing computer data bits on a tape specifically arranged to practice the invention, which tape reader is connected to the processing unit for storing the data bits in the memory register, and means for connecting I/O devices to the processing unit.

The invention of said application contemplates as a basic programming tool a programming work sheet that is delineated to define a series of vertical columns to which the inputs and outputs of the process being programmed are respectively assigned, and a series of superposed horizontal channels which have consecutively assigned to same, the sequential steps of the process being programmed. The work sheet columns and channels intersect to form individual work sheet data bit receiving blank areas to which manual entry marking marks, such as an "x", or a check mark, are applied for indicating I/O functions that are to be activated or changed for each step of the process, in accordance with the desired predetermined program of operation of the equipment that has been or is being set up to perform the process.

The work sheet channels for each step, in accordance with the invention, comprises a computer word receiving space, the ends of which are delineated or marked off by appropriate indicia at either end of the respective channels, whereby, utilizing the binary notation numbering system in practicing the invention, the work sheet horizontally extending channels for each process step provide a computer word for insertion in the processing unit memory.

Further in accordance with said invention, the computer words provided by the work sheet are sequentially entered into memory, in sequence in accordance with the order of the process steps involved, and in consecutive or serially oriented groups to form the data base. This is effected, in accordance with the invention, by the provision of a tape that is delineated lengthwise of same to define a plurality of channels that are proportioned to be widthwise congruent or alignable with a predetermined number of the work sheet computer word channels. In a preferred embodiment of the invention, the tape is proportioned widthwise of same to have its channel widthwise congruent with eight of the work sheet computer word channels.

The tape is arranged for permitting manual application to same of the computer word data entered on the corresponding work sheet channels in the practice of the invention; this is done by laying one end of the tape over the face of the work sheet, and over the top group of work sheet channels, and in centered or congruent relation thereto, with the overlying tape channels being manually marked in correspondence with the manual markings of the work sheet for the work sheet channels involved (the top eight work sheet channels in the indicated preferred embodiment). The tape is also marked in each of its channels to indicate the location of the work sheet word end indicia so that the word length for the first group of computer words being applied to the tape is delineated at either end thereof in each channel of the tape that is to correspond to a work sheet computer word channel.

The programming data for the next group of the same number of work sheet computer word channels is applied to the next consecutive length or section of the tape in its corresponding channels in like manner, with the tape being appropriately moved lengthwise of same to overlie the second group of work sheet channels with a fresh length of tape commencing from the ends of the first set of computer words as applied to the tape. Again, the manually marked data work sheet in the second group of work sheet channels is manually applied to the fresh tape section, as well as the indicia indicating the ends of the word length involved.

The programming data of the work sheet for the remaining steps of the process is applied to the tape in like manner.

Further in accordance with the invention of said prior application, the programming data that has been applied to the tape is entered into memory using a tape reader arranged to sense the data bits represented by the indicated data application to the tape, and with continuous and uninterrupted movement of successive lengths of the tape through the reader. The tape reader is arranged binary system fashion to indicate for each I/O location of a computer word representing a process step as zero if there has been no manual marking in the work sheet space provided for same, and a "1" if there has been a manual marking in such space.

The invention of such prior application contemplates that tape reading arrangements of the electrical, photo, or punched tape type may be employed as desired for particular applications. The invention further contemplates that the tape reader be arranged so that the tape may be manually pulled through same to effect the reading functions of the reader and insert into memory the consecutive groups of computer words representing the sequential steps of the process, as successive lengths of the tape are manually pulled through the reader. The reader thus is of the continuous motion reading type.

Assuming that the microprocessor employed as the invention of said application contemplates, is, for instance, either a Fairchild F-8 unit, or an Intel 8080 unit (both are eight bit central processing units), with such units having random access memory (RAM) after the program is in memory (to form the processor data base), it is appropriate to manually step through the program with the processing machine power off to check out the accuracy of the program. Assuming that the processing equipment is otherwise ready for operation, the programmer may then be put on automatic operation to effect sequential performance of the industrial process involved in accordance with the predetermined order provided by the program in question.

At the outset it will be seen that programming utilizing the invention of said application can be effected by personnel who, though they should be familiar with the operation of the processing machines involved and have the technical qualification this requires, they need not have any significant programming training or experience, and especially, they need not have familiarity with ladder diagram technology. Layout of the program on the work sheet is simple and uncomplicated, and provides a visual overview of what is to happen as each step of the process is performed. The resulting computer work data for each process step is readily transferred to tape using convenient manual marking methods, with the tape and reader being arranged for simply draw through application of the tape to the reader. The tape serves as a permanent record of what is in memory, though both the work sheet and the tape may be varied as desired to change the program, with the new revised program being inserted into memory as a revised data base by again merely pulling the tape through the tape reader to automatically cancel out the first program from memory and insert the new or revised program in its place.

The present invention is directed to a tape and reader arrangement of the type described in said application prior, in which the tape is formed and delineated for accurate and ease of application thereto of the computer data word sets that the process I/O functions are reduced to, and a reader arrangement therefor for error free and effective pick up and insertion into memory of the data carried by the tape, and by employing simplified and economical manual tape pull through techniques.

A principal object of the present invention is to provide a tape and reader arrangement for carrying out the invention disclosed in said application whereby the need for high skilled programming personnel is eliminated, and the programming can be efficiently done by personnel who have no special programming experience or training, but do have the necessary technical experience needed to understand and operate the processing equipment involved.

Another principal object of the invention is to provide a programmable controller arrangement that utilizes the binary notation system and a work sheet for laying out the process steps in sequentially consecutive manner in terms of the I/O device functions for each process step, to provide computer words for each step, and to provide a tape and reader arrangement that is arranged for simple and effective manual marking of the tape to transfer the resulting computer words in modularized grouping or set form for serial application of same into memory, utilizing for the manual marking electrically conductive marking implements whereby, when the tape is passed through the reader, the reader functions to sense by way of electrical impulses the coded information applied to the tape and insert same in the processor memory.

Another important object of the invention is to provide reliable programmable controller programming equipment of greatly reduced cost and ease of use, and which requires no special training or experience to use with facility.

Yet another object of the invention is to arrange the reader so as to be separately useable as such for other data reading applications, such as for entering digital data of a general nature into a computer.

Still other objects of the invention are to provide programmable controller equipment that is economical of manufacture, convenient to install and use, and is long lived and efficient in operation.

In accordance with the improvements disclosed in the present application, an improved work sheet, tape, and tape reader are provided for industrial process programmable controller systems of the type disclosed in my said prior application, in which the I/O functions for the process steps have been delineated or laid out on the work sheet in sequentially consecutive binary notation fashion computer data word form, in the order of sequence of the process steps, in which the tape is a ribbon formed from a light pervious material and is delineated to define channels extending longitudinally thereof and columns extending transversely thereof that are oriented to be aligned and centered with a group of the corresponding work sheet channels and columns which bear a corresponding number of the work sheet computer words, when the ribbon is applied to the face of the work sheet in overlying relation to same with the ribbon disposed in juxtaposition with the work sheet face.

The ribbon channels and columns are formed by imprinting one side of the tape in electrically conductive ink to define equally spaced guide dots that delineate the tape channels and columns involved. The imprinting on the tape also includes a double channel of short, parallel synchronization markings respectively spaced apart and aligned with the respective transverse rows of column forming guide dots.

The tape is manually marked in practicing the invention by connecting in each tape channel the guide dots representing the space of the tape that corresponds to the corresponding data bit space of the work sheet that is manually marked on the work sheet in laying out the industrial process steps on the work sheet. This same marking is employed to indicate both the computer word ends and the I/O functions that are specifically noted by the computer word in question in accordance with the binary notation system.

The present invention contemplates that the work sheet columns and channels will be delineated with the same system of guide dots employed on the tape, and the work sheet will have markings for matching with the tape synchronization markings.

The reader is in the form of a housing body formed from a suitable electrically insulating material, that preferably has self lubricating characteristics, to define two rows of contact receiving bores or chambers in each of which is mounted a feeler assembly of special configuration and characteristics. The reader body has a circuit board applied to one side of same and a cover applied to the other side of same, with the reader housing body and cover being formed to define a slideway extending through the reader through which the tape is passed in guided relation thereto to properly align the tape channels with the reader contacts that are to be placed in sensing engagement with the respective tape channels.

The circuit board is imprinted with electrically conductive material to define contact seats respectively aligned with the housing feeler bores. For each tape channel the reader provides a set of two feeler assemblies spaced apart longitudinally of the reader slideway a distance corresponding to the distance between the tape guide dots, longitudinally of the tape.

The reader contact assemblies each comprise a feeler finger or pin mounted in the respective housing body bores; the feeler pins each have a spherically contoured head that is spring biased against the cover for engagement with the imprinted and manually marked side of the tape when the tape is passed through the reader. The spherical contour of the heads permits the insertion of the tape into the reader to cam the pins away from contact with the reader cover against the biasing action acting on the respective feeler pins involved, which is by way of a compression spring seated between the other end of the respective feeler pins and the circuit board contact seat aligned with same.

The reader is arranged to be notched, at the entrance end to the reader slideway, so that the operator in entering the leading end of a tape into the reader, may use a thumb or finger to slide the leading end of the tape through the reader for grasping to pull the tape through the reader.

The reader contacts are arranged so that the individual manual markings of the tape close an electrical circuit in the reader for each tape manual marking. For the reader contacts aligned with the tape channels bearing the computer word manual markings, the electrical signals created by the closing of the circuits for the related feeler pins effect the sensing by the reader of the computer word information involved, which is then transmitted into memory. The synchronizing mark that is aligned with each tape column electrically relates the computer word indicia involved for synchronization purposes insofar as insertion into memory is concerned.

It will thus be seen that the tape is the ultimate of simplicity and design while being readily understandable for facile use by programmers without requiring any special programming experience or training.

The reader is formed from few and simple parts and does not require any drive mechanisms or power input for that purpose since manual feed through of the tape through the reader slideway is the preferred way of moving the tape with respect to the reader.

Other objects, uses, and advantages will be obvious or become apparent from a consideration of the following detailed description and the application drawings in which like reference numerals indicate like parts throughout the several views.

In the drawings:

FIG. 1 illustrates the layout of a typical work sheet and is devised in accordance with the practice of the invention of my said prior application, FIG. 1 being identical to FIG. 1 of said prior application;

FIG. 2 diagrammatically illustrates one form of manually markable tape that may be employed in connection with the invention with the tape illustrated being the form of FIG. 3 of my said prior application and being adapted for manual marking with electrically conductive inking or pencil for electrical sensing of the programming data involved;

FIG. 4 is a diagrammatic exploded perspective view of the component parts of the reader, as viewed from the cover side of same;

FIG. 5 is a diagrammatic perspective view of the underside of the reader housing body showing in outline the circuit board that is to be applied to same and showing several of the contact fingers displaced therefrom;

FIG. 6 is a side elevational view of one of the contact pins on an enlarged scale;

FIG. 7 is a fragmental transverse cross-sectional view along a section line extending longitudinally of the reader slideway illustrating a pair of adjacent feeler contacts operatively engaged by one of the tape channel manual markings;

FIG. 8 is a diagrammatic plan view illustrating the tape and circuit board of the reader oriented in operative relation (as viewed from the under side of circuit board as shown in FIG. 4) to better illustrate the manner in which the tape manual markings become operatively associated with the reader contacts;

FIG. 10 is an enlarged view of the reader circuit board contact seats and related circuitry shown in FIG. 9.

However, it is to be distinctly understood that the specific drawing illustrations provided are supplied primarily to comply with the requirements of the Patent Laws, and that the invention may have other embodiments which will be obvious to those skilled in the art, and which are intended to be covered by the appended claims.

GENERAL DESCRIPTION

As disclosed in my said prior application, a programmable controller embodying the principles of my invention of said prior application Ser. No. 779,579 may take the form of a processor operated from a suitable control panel and having operably associated with same a memory register and a tape reader, with the processor being connected by a suitable data buss to the output and input modules that usually take the form of suitable input and output boards. A typical layout of such an arrangement is shown in FIG. 10 of my said prior application.

In a practical embodiment, the processor may be, for instance, either a Fairchild F-8 microprocessor or an Intel 8080 microprocessor, both of which employ eight bit central processing units. A byte oriented memory is preferred and this preferably is of the random access (RAM) type (and thus is a "read/write memory") arranged as diagrammatically illustrated in FIG. 11 of my said prior application. However, sequential access type arrangements such as disc, tape or bubble memory may be employed.

Figure 1:
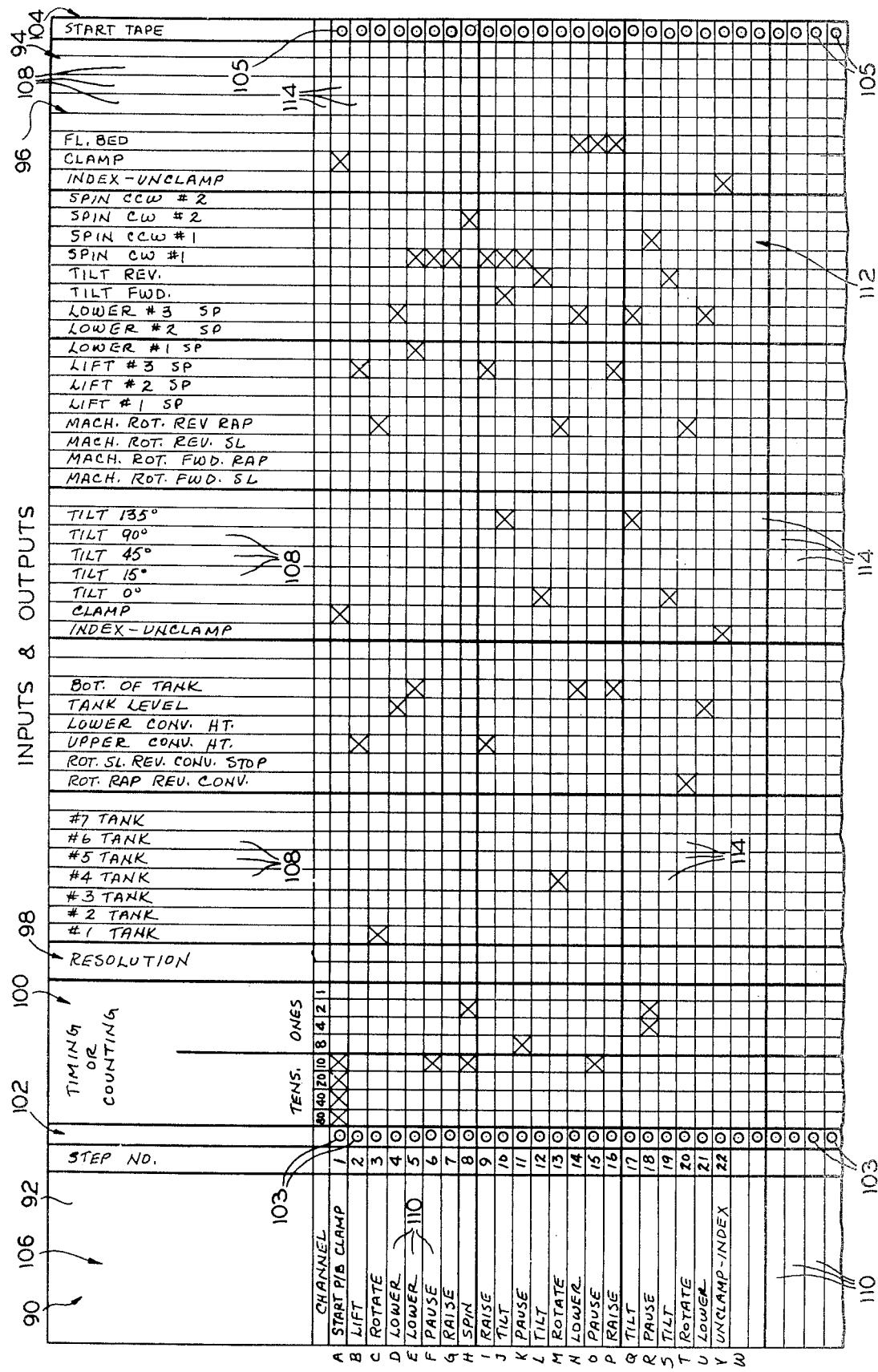

To facilitate an understanding of how the tape disclosed in the instant application is applicable to the work sheet that is prepared in accordance with the practice of the invention of my said prior application, FIG. 1 of the present application is identical to FIG. 1 of my said prior application, which illustrates the laying out of the program of a process for making molds for investment casting and is outlined in my said prior application, to which reference may be had for a diagrammatic illustration of such process.

For the purpose of providing background disclosure material for use in appropriately describing the tapes disclosed in this application, a portion of the disclosure of said prior application is included in the present application with regard to the organization of the work sheet, since it is the work sheet to which the tapes are applied for pick up of the computer word indicia involved in accordance with the practice of the invention.

Thus, in accordance with the practice of the basic invention disclosed in my said prior application, the various inputs and outputs for controlling the operation of the processing equipement involved are itemized in their sequence of operation related to the various individual steps that are to take place. In the specific case disclosed in said application, this itemization would be concerned with the individual consecutive steps that the machine involved goes through in processing the individual mold clusters from start to finish.

With this information at hand, the work sheet 90 of FIG. 1 is prepared.

The work sheet 90 comprises a suitable substrate 92 that is formed or delineated on one side or face of same to define across the top of same a control zone 94 having an input and output subzone 96, a resolution subzone 98, and a timing or counting subzone 100. Zone 94 is interposed between the spaced apart vertically disposed tape locater columns or zones 102 and 104.

Work sheet 90 is also formed to define or delineate a step zone 106 that in the form shown extends across the left hand end of the substrate 92.

The work sheet 90 is further delineated to define in the control zone 94 a plurality of vertical columns 108 that are extended to the lower edge of the work sheet, while the step zone 106 defines a plurality of horizontal channels 110 which are extended across the work sheet to the right hand edge of same and in intersecting relation with the columns 108.

The intersecting columns 108 and channels 110 lie in the work sheet computer word zone 112 wherein the intersecting columns 108 and channels 110 define a plurality of data bit receiving blanks 114 that are adapted to be manually marked in accordance with the practice of the invention.

In utilizing the work sheet 90, the inputs and outputs involved in a particular program are listed across the input and output zone 96 in the manner suggested in FIG. 1, while the consecutive steps to be sequentially followed in operating the apparatus controlled by the program in question are listed in consecutive channels 110 within the step zone 106. Thus, each input and output is assigned a vertical column 108 while each step of the process to be controlled is assigned a channel 110. While the process steps must be listed in sequential order (that is, in the order in which they occur), the listing of the inputs and outputs need not be in any particular order.

The resolution subzone 98 in the form shown may be provided for working time delays into the procedure, while the time or counting subzone 110 is concerned with providing the controlling data that starts the program action when the programmer is put into operation and also may provide for no operation of a particular step and a going immediately to the next step, or possibly reserving a step for later insertion in the progam. Steps removed from the program can be replaced with data indicating no operation. This aspect of the system will be determined in light of known technology on this subject, by the nature of the machinery to be controlled and the type and nature of the process involved.

The work sheet tape locator zones 102 and 104 preferably have formed in same for each channel 110 the respective indicia 103 and 105 that are to indicate the ends of the respective computer words to be formed by using channels 110 and manually marking same, as will now be discussed.

With the work sheet 90 laid out in the manner indicated, the operator, having in mind the steps to be performed in the process, the sequence of the steps, the inputs and outputs involved, and other control features that may be necessary or desirable, including the aforementioned resolution and timing or counting, can manually mark the work sheet 90, in the area of the spaces 114, to indicate, utilizing the binary notation system, when something is to happen. Assuming that spaces 114 left blank mean nothing is to happen and spaces 114 suitably marked indicate that some control action is to be taken (which is comparable to the zero and the "1" of the binary system), the engineer having determined what is to happen with reference to the various machinery components being controlled during the operation of the method, can mark the appropriate blank spaces 114 accordingly, as by employing the letter "x" (as indicated), a check mark, or the like.

In accordance with the invention of said prior application, the portions of the channels 110 extending between the tape locater zones 102 and 104 become computer data word areas or channels that are coextensive with the summation of the data bit blanks 114 lying in each of such channels 110. With the channels 110 marked as indicated for a particular program, the data bit information of the respective channels 110 in summation thus comprises the computer data word for each step of the process being controlled. It is an important aspect of the invention that as the data bits involved for each process step have been oriented in computer word form, the words for each step may be transmitted from the work sheet into the process or memory without requiring ladder diagram technology or the like.

For this purpose, the invention of said prior application contemplates that the computer words defined by work sheet 90 be manually formed on a tape for passing through a suitably equipped tape reader that will sense the computer words in question and insert them in the processor memory in preparation for operation of the controller. As disclosed in my said prior application, the types of tapes and tape readers that may be employed may be of several different types consistent with the objectives of the invention. The basic idea involved in each type is that each tape is formed to define a plurality of longitudinally extending channels that are proportioned laterally of the tape to be aligned or centered with the channels 110 of the work sheet 90. The number of such channels employed in a particular tape may be as desired, depending on the particular type of processor equipement employed. Since eight bit equipment has been suggested, the tapes as arranged for use with such equipment should have at least eight of such channels and be sufficiently wide to provide for application thereto of synchronization markings or their equivalent for proper timing relation with the tape reader employed.

In any event, in accordance with the invention of said prior application, the computer words of the work sheet 90 are transferred to a tape arranged in accordance with the invention of said prior application by manually marking the tape to reflect the data markings and the work end indicia, on the tape, for each computer word involved. This is done in practice by taking one end of the tape (which is to be the leading end of the tape) and marking it manually to show both the location of the computer word end indicia for the first eight channels 110 of the work sheet 90, and the manual markings of the areas 114 contained therein. This being completed, the computer words of the first eight steps of the process have been applied to the tape leading end; then the next adjacent portion of the tape is marked in like manner with the next set of eight steps of the work sheet in like manner, and so on, until the computer words of all the process steps of the program have been applied to the tape. This completes the preparation of the tape. When the controller is to be programmed using the tape, the tape is passed through the reader to effect insertion of the program now outlined on the tape into the controller memory to form the controller data base, with the individual computer words of the respective process steps in sequential orientation, and the individual groups of eight computer words of the process steps in consecutive series or serial relation.

Figure 2:
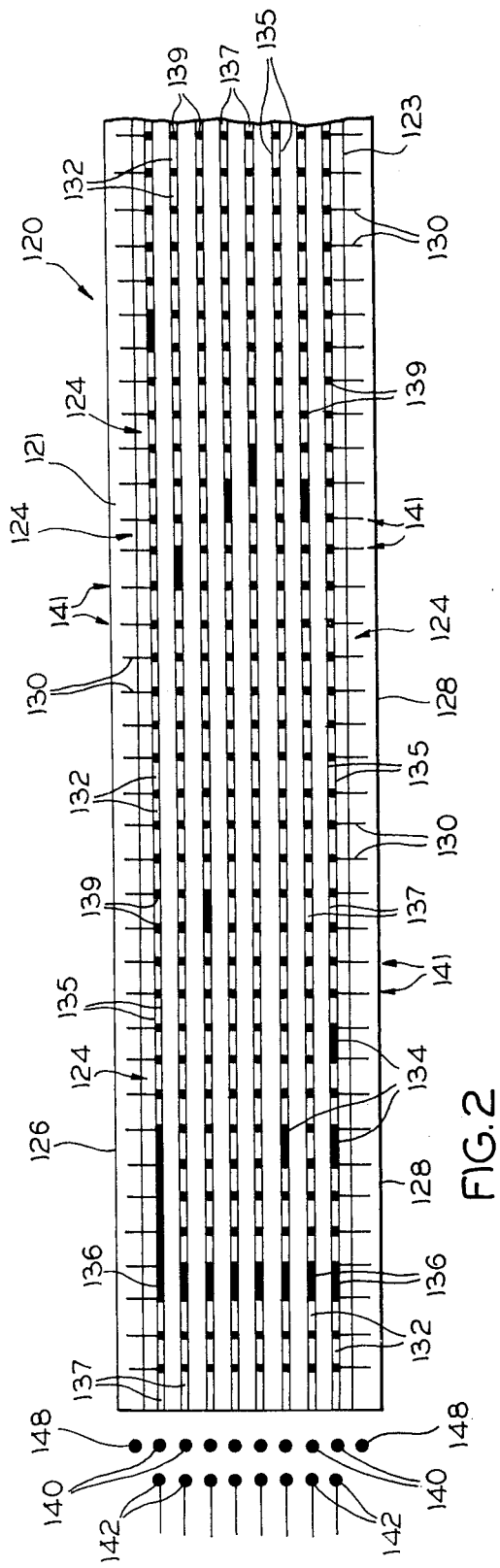
Figure 3:
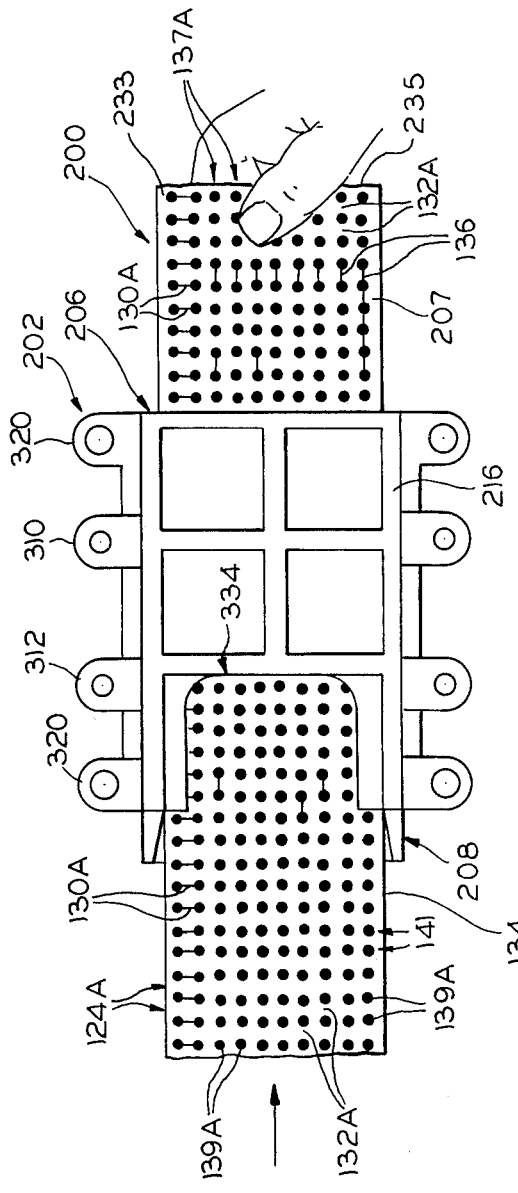
FIG. 3 illustrates a simplified and improved tape and reader arranged in accordance with the present invention, with the reader being shown in plan from the cover side of same and the tape being illustrated in the process of being manually pulled through the reader.

FIG. 2 of the present application illustrates tape 120 of FIG. 3 of my said prior application, which comprises a ribbon or web 121 of a suitable translucent or transparent material that is at least sufficiently translucent so that when laid across the channels 110 of the work sheet 90, the markings in the spaces 114 and the indicia of zones 102 and 104 will be clearly apparent when looking through the tape, as well as the lines forming the work sheet columns 108. In other words, the ribbon should be formed from a light pervious material.

The tape 120 and the tape reader that it is to be associated with are of the electrically conductive data sensing and transmitting type, with the tape 120 being delineated, by employing non-electrically conductive ink or the like to define a plurality of longitudinally extending guide channels 137 (defined by longitudinal lines 135) that are intersected by transversely extending columns 124 defined by guide blocks 139 imprinted within the guide channels 137 and arranged transversely of the tape in individual columns 141 to define the indicated columns 124. The channels 137 and the columns 124 are respectively proportioned to be aligned in congruent or centered relation with the respective work sheet channels 110 and columns 108, so that when the tape 120 is placed on top of the work sheet 90 and against its face, the columns 124 may be matched with work sheet columns 108, the channels 137 may be matched in centered relation with work sheet channels 110 in practicing the invention. Guide blocks 139 are imprinted using electrically conductive ink.

As indicated, since eight bit processing apparatus is employed in the suggested embodiments of the invention, the channels 137 should be a minimum of eight in number. For tape reader synchronization purposes, synchronization markings 130 are applied along either both or one of the side edges 126 and 128 of the tape, aligned with the columns 124, and specifically with the individual guide block columns 141, (that define either side of the columns 124), by employing electrically conductive ink, for effecting proper coordination of the data read by the tape reader and the location on the tape where this data appears. A suitable electrically conductive ink for purposes of the invention is the Electrodag 502 product made and sold by Acheson Colloids Company of Port Huron, Michigan. Markings 130 extend to the guide blocks 139 of the two side edge marginal channels 137 that are adjacent edge marginal lines 123 (imprinted by employing non-electrically conductive ink) that for tape 120 are to coincide with the top horizontal line of the uppermost work sheet channel 110, of the group of such channels 110 to be overlaid by the tape 120 in practicing this invention, and the bottom horizontal line of the lowermost or eighth work sheet channel 110 of such group.

The tape 120 as thus prepared is available for use in practicing the invention, and when used, one end of the tape (which is to be the leading end of the tape) is applied across the top eight channels 110 of the work sheet to initiate application of the computer word data to the tape. This is done by aligning and centering the eight channels 137 of the tape 120 with the top eight channels 110 of the work sheet 90 at the tape end in question, and aligning and centering the tape columns 124 with the columns 108 of work sheet 90. The technician then manually marks on the tape in the data bit blank spaces 132 defined by the tape intersecting channels 137 and columns 124 (represented by the spacing between adjacent guide blocks 139 of the same guide channel 137), a marking 134 in electrically conductive penciling or the like, corresponding to the marked areas 114 of the work sheet channels 110 in question. Thus, the data bit blank spaces 132 to be marked with the markings 134 will be in overlying relation to the marked areas 114 of the group of work sheet channels 110 in question. The same marking is also done as at 136 with reference to the word end indicia 103 and 105 that are applied to the respective work sheet zones 102 and 104, to indicate on the tape the ends of the respective computer words for each step of the program that falls in the group of first eight channels 110 in question.

Markings 134 and 136 may be made using a graphite lead pencil or the aforementioned ink.

The operative computer word data of the next succeeding groups of work sheet channels 110 are marked on the tape 120 in like manner in consecutive sequence orientation. In this connection, the markings 136 representing the trailing end of one set of computer words representing the data in a corresponding set of work sheet channels 110 may be employed to indicate the leading end of the next succeeding group of computer words represented by the operative data bits involved in the next succeeding set of work sheet channels 110.

For purposes of practicing the embodiment of FIG. 2, the program data markings 134 corresponding to the computer word data bits of work sheet 90, and the markings 136 corresponding to the location of the computer word end indicia 103 and 105, are proportioned with reference to the distance between pertinent operating contacts of the reader, as diagrammatically illustrated in FIG. 2, for purposes of closing same to effect a data sensing action by the reader. As indicated in FIG. 2, the reader is arranged following available technology to provide a plurality of spaced contacts 140 aligned in the rectilinear manner indicated in FIG. 2 and suitably connected to a source of electrical power, and spaced from similarly aligned contacts 142 that are suitably oriented in spaced relation from the contacts 140 and respectively connected by lead lines 144 to the relevant portions of the reader for effecting the binary notation system type sensing needed to convert the indicated work sheet and tape manual markings into electrical pulses.

As is common with tape readers of the electrically conductive sensing type, synchronization contacts 148 are provided in spaced relation to the respective end contacts of the set of contacts 140.

Following currently available technology, the tape reader and tape are proportioned and arranged and the contacts 148 are spaced from the respective end contacts 140, such that when the tape moves through the reader, the tape 120 is suitably guided for appropriate centering relative to the contacts 140, 142 and 148, and the synchronization markings 130 all electrically connect the respective sets of adjacent contacts 140 and 148 as the tape moves across the contacts 140. Assuming that the contacts 140 are connected to a suitable source of electrical energy, markings 130 sequentially close the circuits between the respective sets of contacts 140 and 148 to effect synchronization signal generation by the reader.

In addition, the spacing of the individual contacts 140 from the contact 142 paired with same, longitudinally of the path of movement of the tape, is made approximately the width of a tape column 124 and the tape has the electrically conductive markings 134 and 136 proportioned (as defined by guide blocks 139) to extend the full width of the respective columns 124, so that as a particular column 124 of the tape passes over the contacts 140, the respective contacts 140 will be briefly in electrical connected with the respective contacts 142 aligned therewith longitudinally of the tape for generation of the electrical impulses that are to represent the data content of each data word. Lines 135 are positioned on the particular tape 120 to insure that markings 134 and 136 will be lined up with contacts 140 and 142 as the tape is passed through the reader.

It will be apparent, of course, that the manually applied markings to the tape 120 are all on the same side of the tape, and the tape reader is arranged so that as the tape is pulled through the reader, the manually applied markings involved are presented for engagement with the contacts 140, 142 and 148.

Thus, as the tape 120 passes through its tape reader, for each set or group of the channels 137, the word end markings 136 are first sensed to start the reading of the computer words involved in this group of columns 137, followed by the markings 134 representing the individual data bits of each computer word channel involved, with the trailing set of markings 136 effecting completion of the reading of the respective computer words involved into the reader for conversion into the electrical impulses that will effect insertion into memory of the data involved. Succeeding groups of computer words are handled in like manner. The synchronization markings 130 effect their conventional functions of actuating the reader sensing mechanism when it is to be conditioned to sensing manually marked data marking on the tape. When the markings 134 and 136 are applied to the tape 120 in the data bit spaces 132, as defined by adjacent guide blocks 139 of the same guide channel 137, they will have a generous overlap relative to the contacts 140 and 142 when aligned with same.

FIGS. 3 through 8 illustrate a yet further simplified tape 200 and the specifics of reader 202 through which the tape 200 is passed, to enter into the processor memory the program involved, as represented by the computer data word groups or sets that are applied to the tape 200 in accordance with the invention of my said prior application.

The tape 200 is generally similar to the tape 120 and defines guide channels 137A and columns 124A by utilizing the equally spaced guide dots 139A that are aligned longitudinally of the tape to define the respective chennels 137A that are to be aligned in centered relation with the work sheet channels 110A, and to define also the columns 124A that are to be matched with the columns 108A of the work sheet. The guide dots 139A are also aligned in columns 141A that extend transversely of the tape, and synchronization markings 130A, corresponding to markings 130, are provided, which are aligned with the respective columns 141A transversely of the tape along one side edge 128 of the tape 200. The spaces between the guide dots 139A of the respective channels 137A define the tape data bit blanks 132A, corresponding to blanks 132 of tape 120.

In the embodiment of the invention represented by the tape 200, the tape is in the form of a suitable polyester material, such as the Mylar brand polyester tape made and sold by E. I. Du Pont Demours Company of Wilmington, Delaware. The tape is preferably defined by a ribbon 204 formed from the indicated polyester material, and which is preferably either transparent or at least sufficiently translucent so that when laid over the face of the work sheet 90, the columns 108 and the channels 110 of the work sheet will be visible through the tape.

The guide dots 139A and the synchronization markings 130A are imprinted on the same side of the tape, and by employing electrically conductive ink, and the programmed data markings 134 corresponding to the computer word data bits of work sheet 90, and the markings 136 corresponding to the location of the computer word indicia 103 and 105 of the work sheet, are applied to the same side of the tape that guide dots 139A are on. Thus, in the tape 200, all the imprinting and manual marking is applied to the tape side 205, as distinguished from the tape back side 207, and by employing electrically conductive ink. The tape itself is electrically non-conductive.

Where the tape 200 is made from clear or transparent film, such as the aforementioned polyester film, where the manual markings 134 and 136 are to be made using graphite lead pencil (which is preferred because of its ready availability), the tape side 205 should have a suitable matte antistatic coating, such as the type commonly employed to provide a premium grade drafting surface. This allows an ordinary graphite lead pencil to deposit a low resistance electrically conductive path between adjacent guide dots 139A, to form markings 134 and 136. The antistatic property of the coating helps prevent dirt adherence to the coated side of the tape. Film of the matte coated type indicated is commercially available, one source being Transwrap Company of Chicago, Illinois.

Where ink is employed to make the markings 134 and 136, the matte coating is not required.

The tape reader 202 is arranged in accordance with the basic objective of the invention of the Applicant's said prior application to provide for manual application of the tape to the reader and manual pull through of the tape through the reader to effect entry of the computer word data involved into the processor memory.

The reader 202 (see FIGS. 4 and 5) comprises a housing 206 that includes a housing body 208 having applied to its underside 210 a circuit board 212, and having applied to its top or upper side 214 a cover or cap 216.

The housing body 208 is of one piece molded construction and is formed from a suitable electrically insulating material that preferably, but not necessarily, has self lubricating, thermoplastic characteristics. While a material such as a suitable Bakelite composition will be satisfactory, it is preferred that the material be a self lubricating polymeric material such as nylon. In a specific embodiment of the reader 202, the housing body 208 is formed from nylon containing a suitable amount of molybdenum disulphide, utilizing suitable injection molding techniques.

The body 208 is generally planar or flat in longitudinal configuration with its underside 210 being planar for application thereto of circuit board 212. The upper side 214 of the body is recessed or slotted as at 220 to define a slot way 222 having a planar floor 224 that extends between the tape entering end 226 of the slot way 222 and its exit end 228. The slot way 222 on either side of same is defined by upstanding opposed side walls 230 that are spaced apart a distance which complements the transverse dimension of the tape 200, except at the entrance end 226 of the slot way 222, wherein the side walls 230 are outwardly angled as at 232 to facilitate the insertion of the leading end 233 of the tape 200 into the reader.

The housing body 208 is formed on either side of same with a pair of inner lugs 236 and a pair of end or outer lugs 238 for reception of securement screws in a manner to be described.

The housing body 208 between two of the transversely aligned lugs 236, on either side of the housing body, is formed with two rows of contact assembly receiving bores 240 and 242, of which a bore 240 and a bore 242 are aligned, as a pair, longitudinally of the path of movement of the tape through the reader, and thus longitudinally of the longitudinal direction of the slot way 222. As indicated in FIG. 7, the bores 240 and 242 each receive a contact assembly 244 comprising a contact finger or pin 246 and a biasing coil spring 248 therefor. The fingers or pins 246 each comprise a shank 250 of cylindrical configuration having an external diameter approximately complementing the internal diameter of the respective bores 240 and 242 for smooth sliding action of the fingers 246 longitudinally of the respective bores. Each contact finger shank 250 at its head end 252 is formed with an upstanding stud 254 terminating in a spherically contoured end 256 to define a contact head portion 258 for the shank 250. It is the contact finger or pin head portions 258 that cooperate with the tape 200 in the operation of the reader.

The finger shanks 250 each define planar ends 260 against which the springs 248 seat.

The circuit board 212 comprises a suitable substrate formed from a material suitable for making circuit boards (such as a suitable thermosetting resin reinforced with fiberglass or paper) which has imprinted on its side 269 two rows of contact seats 270 and 272 that are disposed and oriented in location and number to be aligned with and centered in the respective housing body bores 240 and 242, respectively, as indicated in the drawings.

In accordance with this embodiment of the invention, the housing body bores 240 and 242 and the contact seats 270 and 272 aligned therewith are also spaced and oriented for alignment with the channels 137A of the tape 200 when applied to the reader. In addition, the housing body 208 includes two additional sets of the bores 240 and 242, indicated by reference numerals 240A and 242A, centered and aligned correspondingly located extra sets of contact seats 270A and 272A, which each have a contact assembly 244 associated with same and positioned and oriented for alignment with the synchronization markings 130A, all in the manner best indicated in FIG. 8.

The contact assemblies 244 applied to the respective bores 240, 240A and 242, and 242A, are thus the same, with the contact assemblies 244 applied to the respective bores 240 and 242 acting between the respective seats 270 and 272 and the tape 200, while the contact assemblies 244 applied to the respective bores 240A and 242A act between the respective contact seats 270A and 272A and the tape 200. The arrangement is such that the spherically contoured end surfaces 256 of the contact finger head portions 258 are to be in sliding contact with the tape, and on the side 205 of same that bears the guide dots 139A, the synchronization markings 130A, the program data markings 134, and the computer word end indicating markings 136.

In the specific embodiment of the invention illustrated in FIGS. 4 through 8, the contact seats 270 are all electrically connected (by connectors 271) except for the end contact seat 270A that is closest to the adjoining side edge of the slot way 222. This end most seat 270A is electrically connected (by connector 273) to the seat 272A aligned with same while the other seat 270A is electrically connected (by connector 275) to the seat 272A aligned with same, as indicated in FIG. 8. Lead lines 144 electrically connect the respective contact seats 272 to the wired reader connections applied to the circuit board in a conventional manner where indicated at 280 for electrically connecting the contact seats 272 to conventional components for converting to electrical signals the circuit closings effected due to the tape manual markings applied to the channels 137A when the tape is passed through the reader. The inner contact 272A has a lead 144A connecting same to ground or other equivalent common connection while the outer contact seat 272A has a lead 144B connected to the circuit board synchronization sensing wiring.

The contact seats 270, 272, 270A and 272A and their electrical interconnections and leads may be formed on the circuit board by the practice of a suitable imprinting technique, such as silk screening, using suitable electrically conductive inks; plating techniques, using gold, silver, or the like, or etching techniques (where the board has copper foil or the like forming its side 269) may also be employed. The wiring connections at the connection area 280 may be of any suitable conventional wiring connector type, with the underside 210 of the housing body 208 being recessed as at 284, and board 212 being suitably perforated, to accommodate this.

The contact fingers 244 and springs 248 are formed from steel, having a Rockwell hardness in the range of from about 60 to about 65 to resist the abrasive action of the tape matte coating, and it is preferable that the heads of the contact assemblies engage the tape with a pressure of approximately one ounce per pin. Stainless steel 440, hardened to the Rockwell C range indicated, is the preferred material as it is resistant to rust or oxidation and is relatively inexpensive and readily hardened.

The circuit board 212 is attached to the underside 210 of the housing body 208 by a centrally located attachment screw 290 that passes through central opening 292 of the circuit board into threaded engagement with the threaded opening 294 on the underside of the housing body 208. With the circuit board secured to the housing body 208 in this manner and the circuit board 212 oriented with respect to the housing body to align its contact seats with the respective housing body contact assembly receiving bores, the respective contact assemblies 244 may be applied to the respective bores with the spherically contoured ends 256 facing outwardly of the bores, as indicated in FIG. 4. The cover 216 is then applied over and against the housing body upper side 214 to hold the contact assemblies 244 in place and define a slide way 300 through the reader through which the tape 200 is passed, and which is defined in the illustrated embodiment by the slot way 222 and the planar underside 302 of the cover 216.

The cover 216 comprises a generally planar cap member 304 preferably formed from the same material as housing body 208, and in the form shown, defines on either side of same an inner pair of attachment lugs 310 each formed with threaded openings 312 adapted to be aligned with screw receiving openings 314 of the corresponding housing body lugs 236 and the correspondingly located openings 316 of the circuit board to receive the respective attachment screws 318 that fix the cover 216 against the top side 214 of the housing body 208 and also hold the reader components in operative alignment.

The cover 216 is also formed to define the outer pairs of corner lugs 320 formed with screw receiving openings 321 that are to be aligned with the corresponding openings 322 of the housing body lugs 238, and the correspondingly located corner openings 324 of the circuit board, for receiving suitable mounting screws 325 for mounting the reader as a unit in operative position on suitable supporting structure.

Cover 216 at the end 330 thereof that is disposed adjacent the entrance end 226 of the slot way 222 is slotted or indented as at 332 to define a working opening 334 of generally U-shaped configuration which exposes a substantial portion of the entry end of the slot way 222 for finger manipulation of the leading end of the tape 200 into slideway 300 as the tape leading end 233 is initially being applied to the reader 202.

The operator applies the leading end 233 of a tape 200 to the reader 202 by inserting same within the entrance end 226 of the slot way 222 so that the tape leading end 233 will underlie the cover web portions 334 and 336 that in part define the cover working opening 334. The operator may then use one of his fingers or thumb to feed the leading end of the tape through the reader, by applying the digit involved with light pressure against the side of the tape facing the observer in FIGS. 3 and 4 (which is the back or unmarked side 207 of the tape 200), at the entrance end of the opening 334, and then sliding the tape to the right of FIGS. 3 and 4, with this sliding operation being repeated as necessary until the leading end 233 of the tape 200 emerges from the exit end 228 of the slot way 222, where it may be grasped by the operator for pulling the entire tape through the reader manually.

Of course, the tape 200 has now been applied to the reader with its surface 205 that bears the electrically conductive imprinting that has been described facing the slot way base surface 220 and the contact feeler assemblies 244.

The underside 210 of reader body 208 and the top surfacing of cover 216 may be appropriately recessed and reinforced to minimize the molding material needed to make this item while providing for adequate reinforcement. In the reader 202, the body 208 at the entrance end 226 of slot way 222 is extended outwardly of the slideway 300, as at 337, to extend the floor 224 for facilitating the application of the tape leading end to the reader slideway 300.

FIG. 8 illustrates more specifically the preferred form of tape, which in accordance with this invention, is applied to be reader 202, it being understood that insofar as the reader 202 is concerned (in the showing of FIG. 8), only the circuit board 212 and contact seats and leads applied to same are shown in outline, and these are viewed from the underside 267 of the circuit board. The leading end 233 of the tape 200, which is at the left hand side of FIG. 8, has been shown to be marked in the same manner as the leading end of the tape 120 which thus bears the I/O data bit manual markings of the first eight channels of work sheet 90 (together with the word end indicia for each of the computer words involved). Of course, the succeeding portions of the tape to the right of FIG. 8 will bear the corresponding manual markings for the succeeding groups of the work sheet channels 110.

The tape 200 is to move through the reader 202 in the relative direction indicated by the arrow 340 of FIG. 8, relative to the contact seats and associated contact assemblies 244 as applied to the circuit board 212 with the organization shown in FIG. 8.

As the tape 200 moves through the reader and the manually made markings 134 and 136 pass by the respective contact seats 270 and 272, and their associated contact assemblies 244, feeler pins 246 of paired assemblies 244 are briefly placed in electrical connection through the respective marks 134 and 136 involved, as suggested in FIG. 7.

For instance, noting that contact seats 270 and the inner contact seat 270A are connected to ground or other common connection, assuming the mark 134 connects two of the guide dots 139A in the first channel of tape 200 (which for convenience may be considered the uppermost channel 137A in the showing of FIG. 8), when the mark 134 in question is in contact with the feeler pin heads 252 of the underlying feeler assemblies 244 of the underlying assemblies 244, this will briefly place these two feeler assemblies in electrical connection for supplying of an electrical pulse by way of lead 144. At the same time, two of the synchronization markings 130A will be in alignment with the feeler pin assemblies 244 associated with the contact seats 270A and 272A.

Thus, assuming that the mark 134 in question is that immediately to the left of the circuit board 212 as shown in FIG. 8, once such mark 134 engages the feeler pin assemblies 244 having the two contact seats 270 and 272 aligned with same, the synchronization marks 130A of that tape column 124A are aligned with the feeler pin assemblies 244 of the contact seats 270A and 272A, with the mark 130A on the left side of such column 124A bridging the contact assemblies 244 of the two contact seats 272A, and the mark 130A on the right side of the column 124A in question bridging the contact assemblies 244 of the contact seats 270A, whereby the signal provided by the mark 134A is accompanied by a synchronizing signal for memory orientation purposes, as aforedescribed.

The spherical coutour of the contact finger head portions 258 enables the leading edge 235 of the tape in being passed through the reader to cam the contact pins 246 away from their position of engagement with the cover 212 which they assume when the tape has been completely pulled through the reader. This disposes the contact pins 246 in engagement with the side 205 of the tape that bears the electrically conductive markings that have been described.

Figure 9:
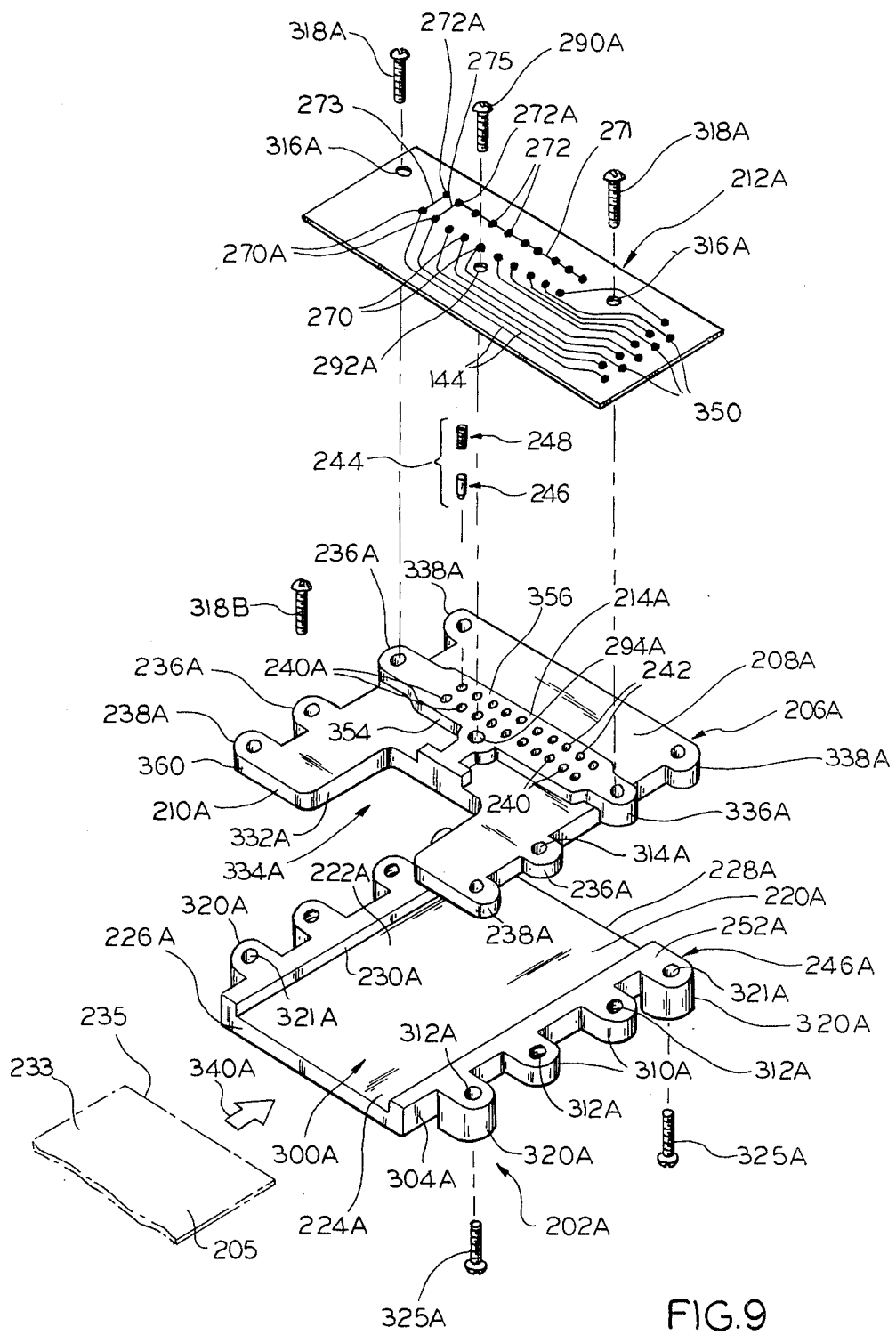
FIG. 9 is a view similar to that of FIG. 4 illustrating the reader in its preferred form, with the circuit board circuiting shown as viewed from the underside of the circuit board.

FIG. 9 illustrates a modified reader 202A that functions in a manner that is similar to reader 202, but which involves improvements that make it the preferred reader arrangement for the practice of the invention.

Reader 202A comprises housing 206A that includes housing body 208A having base cover 216A applied to its underside 210A and circuit board 212A applied to the top or upper side 214A.

In the reader 202A, the housing 206A and base cover 216A are formed from the same material as the housing body 208 and cover 216 of reader 202. Similarly, circuit board 212A is generally similar to circuit board 212, and includes the contacts 270, 272, 270A, 272A and associated connectors 271, 273, and 275, and lead lines 144, 144A and 144B, except that it is the contacts 272 that are electrically connected by connectors 271, as indicated. Lead lines 144, 144A and 144B extend to the respective circuit board wiring openings 350 for connection in the same manner as reader 202.

The modified reader housing body 208A is generally planar or flat in longitudinal configuration with its underside 210A being planar for application thereto of cover 216A. In this embodiment, it is the upper side 252A of the cover 216A that is recessed or slotted as at 220A to define a slot way 222A that is comparable to slotway 222 of reader 202; slotway 222A similarly has planar floor 224A that extends between the tape entering end 226A of the slotway 222A and its exit end 228A. The slotway 222A on either side of same is defined by upstanding opposed side walls 230A that are spaced apart a distance which complements the transverse dimension of the tape 200.

The housing body 208A is formed on either side of same with a pair of inner lugs 236A and a pair of end or outer lugs 238A for reception of securement screws comparable in purpose to the corresponding screws 318 and 325 of reader 202.

The housing body 208A between two of the transversely aligned lugs 236A, on either side of the housing body, is formed with ridge portion 354 extending thereacross and defining a planar top surface 356 that parallels the plane of body 208A and forms its upper side 214A. Along ridge portion 354, body 208A is formed to define the two rows of contact assembly receiving bores 240 and 242, of which a bore 240 and a bore 242 are aligned, as a pair longitudinally of the path of movement of the tape through the reader, and thus longitudinally of the longitudinal direction of the slotway 222A. The bores 240 and 242 of body 208A each receive a contact assembly 244 that is the same as the assemblies 244 of reader 202, and in the same manner.

The circuit board contact seats 270, 272, 270A and 272A and their electrical interconnections and leads of circuit board 212A may be formed on the circuit board 212A (and on the underside of same, as oriented in FIG. 9) in the same manner as described in connection with circuit board 212. Note that board 212A is marked for connecting wiring thereto in the same manner as board 212.

The circuit board 212A is attached to the housing body 208A by the centrally located attachment screw 290A that passes through central opening 292A of the circuit board 212A into threaded engagement with the threaded opening 294A of the housing body 208, and specifically, its ridge portion 354. With the circuit board 212A secured to the housing body 208A in this manner, the resulting subassembly inverted from indicated positioning of FIG. 9, and the circuit board 212A oriented with respect to the housing body 208A to align its contact seats with the respective housing body contact assembly receiving bores, the respective contact assemblies 244 may be applied to the respective bores of body 208A, with the spherically contoured ends 256 thereof facing outwardly of the bore. The bottom cover 216A is then applied over and against the housing body lower side 210A to hold the contact assemblies 244 in place and define the slide way 300A through the reader 202A through which the tape 200 is passed, and which is defined in the indicated embodiment by the slotway 222A and the planar underside 302A of the cover 216A. This disposes the assemblies 244 to have their ends 256 facing slotway floor 224A.

The cover 216A comprises a generally planar cap member 304A that in the form shown defines on either side of same an inner pair of attachment lugs 310A each formed with threaded openings 312A adapted to be aligned with screw receiving openings 314A of the corresponding housing body lugs 236A and a pair of correspondingly located openings 316A of the circuit board 212A (as indicated in FIG. 9) to receive the respective attachment screws 318A that secure circuit board 212A flush against top surface 214A of body 208A (with the circuit board contact seats aligned with the respective body bores 240 and 242), and that fix the cover 216A against the under side 210A of the housing body 208A and also hold the reader components in operative alignment; a second set of screws 318B secure the second set of body lugs 236A to the second set of cover lugs 310A.

The cover 216A is also formed to define the outer pairs of corner lugs 320A formed with screw receiving openings 321A that are to be aligned with the corresponding openings 322A of the housing body lugs 238A, for receiving suitable mounting screws 325A for mounting the reader 202A as a unit in operative position on suitable supporting structure, and in the upright position indicated in FIG. 9, in which the contact pins 246 project downwardly from the circuit board and are spring biased against slotway surface 224A (as opposed to the showing of FIG. 7).

Housing body 208A at the end 360 thereof that is disposed adjacent the entrance end 226A of the slotway 222A is slotted or indented as at 332A to define the working opening 334A that corresponds to working slot 334 of reader 202. This exposes a substantial portion of the entry end of the slotway 222A for finger manipulation of the leading end of the tape 200A into slideway 300A as the tape leading end 233 is initially being applied to the reader 202A, as and in the manner described relative to reader 202.

When the tape 200 has been applied to the reader 202A in the manner indicated, the tape surface 205 that bears the electrically conductive imprinting that has been described faces the body undersurface 210A and the contact feeler assemblies 244.

The tape 200 is moved through the reader 202A in the same manner as it is applied to reader 202, and in the relative direction indicated by the arrow 340 of FIG. 9, relative to the contact seats and associated contact assemblies 244 as applied to the circuit board 212 with the organization indicated in FIG. 9.

As the tape 200 moves through the reader 202A and the manually made markings 134 and 136 pass by the respective contact seats 270 and 272, and their associated contact assemblies 244, feeler pins 246 of paired assemblies 244 are briefly placed in electrical connection through the respective markings 134 and 136 involved, with the same results as described in connection with reader 202.

Reader 202A has the advantage that in its upright mounted position, the feeler assemblies 244 extend downwardly toward cover 216A. Thus, any dirt or other foreign matter getting into the area of assemblies 244 will drop onto the tape and be removed from the reader on movement of the tape through the reader.

Figure 11:
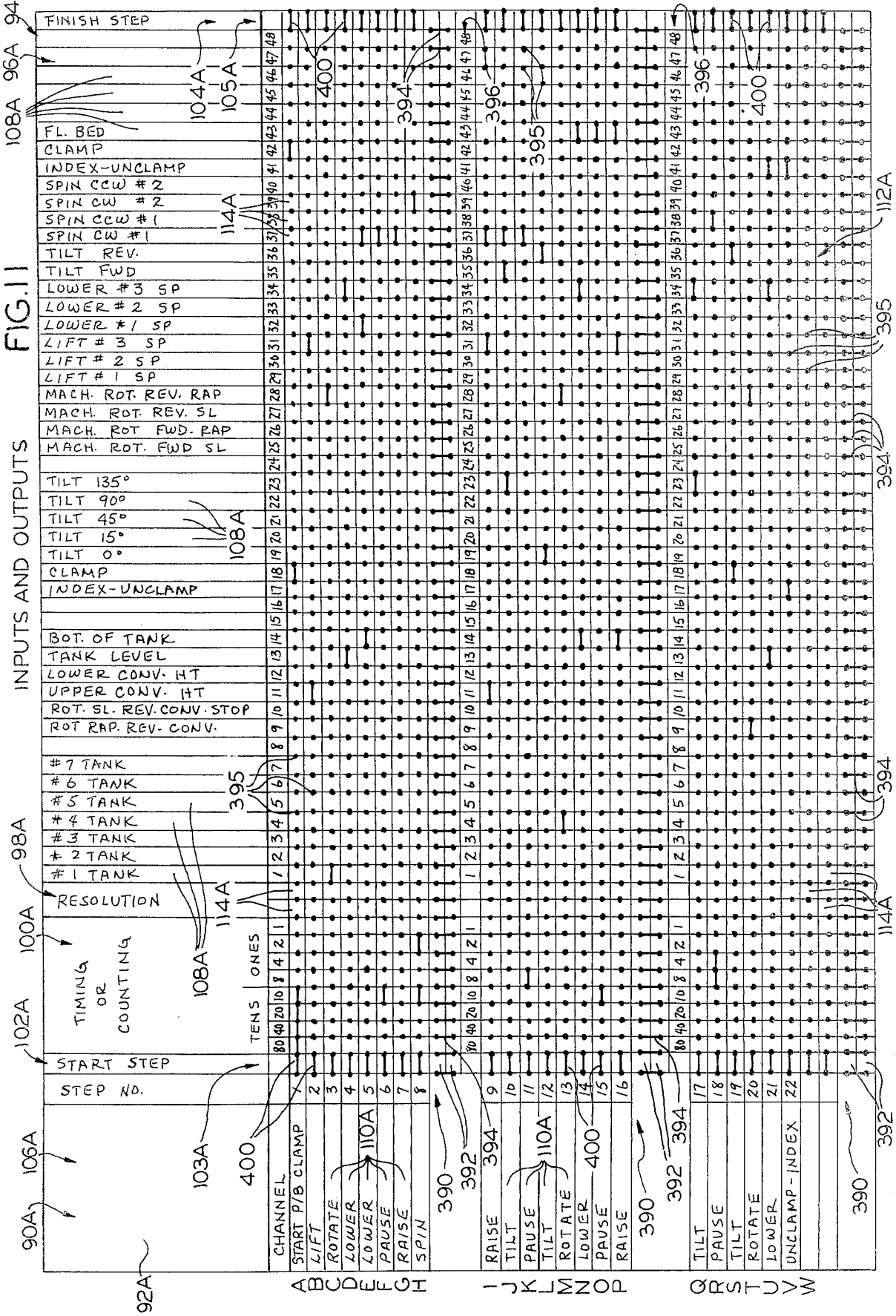
FIG. 11 illustrates an improved work sheet layout arranged for use with the tape of FIGS. 3–9.

FIG. 11 illustrates a preferred revised worked sheet 90A that is delineated for use with the preferred tape 200. Work sheet 90A includes the basic components of work sheet 90 (as indicated by the corresponding reference numerals having the suffix "A"), but is organized to provide specific cooperation with the guide channels 137A, the columns 124A, the guide dots 139A, and the synchronization marks 130A of tape 200.

The work sheet 90A comprises a suitable substrate 92A that is formed or delineated on one side or face of same to define across the top of same control zone 94A having input and output subzone 96A, resolution subzone 98A, and timing or counting subzone 100A. Zone 94A is interposed between the spaced apart vertically disposed tape locater columns or zones 102A and 104A.

Work sheet 90A defines or delineates step zone 106A and vertical columns 108A that are extended to the lower edge of the work sheet, and horizontal channels 110 which are extended across the work sheet to the right hand edge of same and in intersecting relation with the columns 108A.

The intersecting columns 108A and channels 110A lie in the work sheet computer word zone 112A wherein the intersecting columns 108A and channels 110A define the plurality of data bit receiving blanks 114A that are adapted to be manually marked in accordance with the practice of the invention.

Work sheet 90A includes the improvement of providing indicia in the computer word zone 112A that provides for facilitating the congruent lining up of the tape 200 channels and columns 137A and 124A with the appropriate channels 110A and columns 108A, as well as locator columns 103A and 105A, of work sheet 90A.

Thus, as eight bit equipment is illustrated, work sheet computer word zone 112A has the channels 110A subdivided in channel groups 390 of eight such channels 110A each, with the eighth channel 110A of each group 390 having added below same, and above the channel group 390 following it, two supplemental channels 392 that have synchronization lines or markings 394 applied thereto that correspond to the location of tape synchronization markings 130A. The channels 392 are of the same general dimension as channels 110A and are intersected by columns 108A in the same manner as columns 108 intersect channels 110. In addition, the channels 110A and 392 have disposed along their midportions guide dots 395 that are located on the work sheet lines defining column 108A, and that are located to correspond to the location of tape guide dots 139A, when the tape 200 is to be applied to work sheet 90A. Work sheet 90A between each channel group 390 includes a single channel 396 providing blanks for identification of the inputs and outputs for each group 390, as a matter of convenience.

In utilizing the work sheet 90A, the inputs and outputs involved in a particular program are listed across the input and output zone 96A in the same manner as suggested in FIG. 1, while the consecutive steps to be sequentially followed in operating the apparatus controlled by the program in question are listed in consecutive channels 110A within the step zone 106A, in the same manner as in work sheet 90 (keeping in mind that the added channels 392 and 396 intervene between adjacent channel groups 390).

The work sheet tape locater zones 102A and 104A have formed in same for each channel 110A the respective indicia 103A and 105A that are to indicate the ends of the respective computer words to be formed by using channels 110A and manually marking same, as will now be discussed.

With the work sheet 90A laid out in the manner indicated, and the operator, having in mind the steps to be performed in the process, the sequence of the steps, the inputs and outputs involved, and other control features that may be necessary or desirable, including the aforementioned resolution and timing or counting, can manually mark the work sheet 90A, in the area of the spaces 114A, to indicate, utilizing the binary notation system, when something is to happen. Assuming that spaces 114A left blank mean nothing is to happen, and the spaces 114A suitably marked indicate that some control action is to be taken, the engineer having determined what is to happen with reference to the various machinery components being controlled during the operation of the method, can mark the appropriate blank spaces 114A accordingly. In the arrangement of work sheet 90A, the guide dots 395 are employed for this purpose, instead of the letter "X" employed in sheet 90. This is done on the work sheet 90A by connecting the guide dots 395 that are disposed on either side of a data bit blank 114A that is to be so marked.

The work sheet 90A is made out to outline the same process as work sheet 90 (including its inputs and outputs, and process steps in the same order), and thus the same data bit blanks of sheet 90A are marked in this manner, as are shown marked in work sheet 90.

Additionally, the word end indicia 103A and 105A of the columns 102A and 104A are in the form of lines 400 connecting the guide dots 395 provided for this purpose.

In this connection, it is to be understood that the work sheet 90A in its printed or drawn format (as provided for use in practicing this invention) will include as preapplied indicia the guide dots 395, the synchronization lines 394, and the word end lines 400.

In accordance with the invention of said prior application, the portions of the channels 110A extending between the tape locater zones 102A and 104A become computer data word areas or channels that are coextensive with the summation of the data bit blanks 114A lying in each of such channels 110A. With the channels 110A marked as indicated for a particular program, the data bit informastion of the respective channels 110A in summation thus comprises the computer data word for each step of the process being controlled.

Assuming the work sheet 90A is fully filled out as the invention contemplates for the particular process in question, and the data involved is to be applied to a tape 200, the leading end 233 of the tape is applied across the top eight channels 110A of the work sheet 90A (and thus the first channel group 390) to initiate application of the computer word data to the tape. This is done by aligning and centering the eight channels 137A of the tape 200 with the top eight channels 110A of the work sheet 90A at the tape end in question, and aligning and centering the tape columns 124A with the columns 108A such alignment is facilitated in this embodiment of the invention by the technician placing the guide dots 139A of the tape 200 in congruency with the guide dots 395 of the channel group in question (as viewed through the tape), as well as the tape synchronization markings 130A in similarly congruency with the work sheet lines 394. The technician then manually marks on the tape, in the data bit blank spaces 132A defined by the tape intersecting channels 137A and columns 124A, a marking 134 (in the electrically conductive penciling or the like), for each tape data bit space 132A involved, corresponding to the marked areas 114A of the work sheet channels 110A in question, by connecting the tape guide dots 139A. Thus, the tape data bit blank spaces 132A to be marked with the markings 134 will be in exact overlying relation to the marked areas 114A of the group of work sheet channels 110A in question. The same marking of the tape is also done as at 136 with reference to the word end indicia 103A and 105A that are applied to the respective work sheet zones 102A and 104A, to indicate on the tape the ends of the respective computer words for each step of the program that falls in the first group 390 of eight channels 110A in question.

It will be apparent that the electrically conductive guide block and dots 139 and 139A of the tape as well as guide dots 395 of the work sheet in practice may be of any convenient shaping, though the round shape of tape 200 and work sheet 90A is preferred; consequently, the term "guide dot" as used in the appended claims means markings of this type of both round and polygonal shapings. Also, the described congruency that the tape channels and columns are to have with the work sheet channels and columns, for applying of the program data bits to the tape, obviously need not be literal geometric congruency, as proper aligning and centering of the tape channels and columns with the work sheet channels and columns is adequate for the proper practice of the invention, even though the shapes and proportions involved may be varient or different.

Where the tape is partially delineated by printing that is non electrically conductive, for instance as employed in tape 120, such printing is preferably on the opposite side of the tape (for instance, side 207 of tape 200) that the electrically conductive printing and marking are to be applied to, or if on the same side, it is so located so as to be spaced from tape surface areas where the manually applied markings may be applied.

A characteristic feature of the invention is that, as the tape for a particular program is pulled through the tape reader in accordance with the invention, data bits of a predetermined number of computer words are simultaneously supplied to memory to be followed serially by the data bits of the next succeeding set of eight data words, etc. until the program has been entered into memory to provide the controller data base. The reader involved is of the continuous motion reading type, though where the process being programmed calls for a large number of steps, the tape 120 or 200 bearing the computer word data therefor may be longer than the operator can physically pull through the reader in one stroke; thus, while the motion of the tape through the reader may stop at the point where the operator must change his grip on the tape to pull the following length or lengths of the tape through the reader, the basic tape and reader arrangement involved, in accordance with the invention, is of the continuous movement sensing type.

The tape employed for a particular program may be preserved to provide a record of what is entered in the controller memory. Where changes in the program are to be made, they are easily effected by changing the work sheet and then changing the tape accordingly, by repeating the matching of the tape columns to the work sheet columns that has been described, after which the tape is reapplied to the reader to insert the changed program into memory as the original program is erased. Alternately, the original tape can be preserved and a new tape prepared from the changed work sheet, or both the original tape and work sheet may be preserved and a new work sheet and tape prepared to effect the program changes.

In practicing the invention, should electrical failure occur resulting in shutting down of the controller, loss of the data in memory is an immaterial matter since the data needed can be immediately restored to memory by merely pulling the tape bearing the applicable program data through the reader when the power has been restored.

As indicated, a major advantage provided by the invention is that no special programming experience of qualifications are required for preparation of the work sheet and tape contemplated by the invention. The preparer of these materials should be, of course, sufficiently technically qualified with reference to the industrial process being controlled, to be familiar with the various components to be controlled and how they are to be controlled, so that the work sheet can be filled out from the input and output and related control aspects standpoint. Thus, the preparer of these materials may be the processing machinery operator who has had enough experience to run the processing apparatus involved, but who need not be educated either as an engineer or programmer.

In practicing the invention, in the preferred embodiment the tape has a thickness lying in the range of from about four mils to about five mils for adequate stiffness without undue thickness. The reader housing body and cover are to be shaped such that the tape receiving slideway is about twelve mils in depth, and the slotway side walls are spaced apart to slidingly guide a tape having a width of one and one half inches, which is the preferred size for tapes arranged in accordance with the invention, where eight bit processing units are involved.

It will be apparent that the principles of the invention may be applied to programming of a wide variety of industrial processes and the like. The specific mold forming process referred to in said prior application is disclosure provided for illustrative purposes only, primarily to better bring out the application of the principles of the invention to a practical situation.

While the readers herein disclosed are primarily intended for use in practicing the programmable control invention disclosed, the readers have separate utility as general purpose tape readers, as for instance, in connection with entering digital data into a computer.

Where the tapes employed are to have the aforedescribed matte antistatic coating, only the side of the tape that is to bear the computer word indicia involved should be so coated since the pressure of the reader feeler pins biasing the under side of the tape against the reader cover would result in undue abrasive action on the reader cover.

While the memory employed in practicing the invention preferably is of the RAM category, it may be of either the semi-conductor or core type. It is understood that the memory apparatus employed may be operated conventionally in modifying or replacing programs that have been entered into memory, in practicing the tape pull through techniques of this invention.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a programmable controller system for controlling an industrial process, with the system including a central processing unit including an access type memory including a binary notation system responsive instruction register, a programming tape, a tape reader for sensing computer data bits on the programming tape when passed therethrough and connected to said unit for storing the data bits in said memory register, means for connecting I/O devices to said unit, and a work sheet having its face delineated to define the steps of the process in consecutive sequence down the sheet and in manually marked data bit binary notation system fashion horizontal computer word form for each such process step listing in data bit areas of the individual computer words the I/O device functions of the respective process steps and delineating the computer words in equal lengths by means of vertically aligned computer word end indicia at either end of the computer words, the improvement wherein said tape comprises:
a ribbon formed from light pervious material and including means for delineating same to define a group of channels extending longitudinally thereof for the tape length and shaped and spaced transversely thereof to be aligned congruently with a group of said work sheet words consisting of a predetermined consecutive number of said work sheet words, when said ribbon is disposed with one side of same in juxtaposition with said work sheet face and said words are viewed through the tape,
said ribbon being further delineated by said delineating means along its respective channels to define in said channels I/O device data bit spaces consecutively corresponding to and formed to be congruent with said work sheet data bit areas when said ribbon channels are disposed in congruency with said work sheet words,
means for manually marking said tape spaces, when said tape is sequentially placed in juxtaposed congruency with consecutive of said work sheet word groups in overlying relation to the word spaces thereof, corresponding to the location of the I/O device function marks and the word end indicia of the respective words of the individual words of the respective work sheet word groups, for transferring onto said tape from said work sheet the process step data word and said word end indicia thereof for each word of consecutive of said work sheet word groups, to form on said tape consecutive sets of said word data, in each set of which the word data of said process steps are consecutively and sequentially disposed transversely of said tape,
said delineating means comprising uniformly spaced apart dots imprinted on the other side of said ribbon by electrically conductive ink,
with said dots of each tape channel being aligned longitudinally of said tape to form the respective channels and said dots of the respective channels and said dots of the respective channels being aligned transversely of the tape to form spaced columns of said dots,
and with the spacing of said columns of dots in the respective channels forming the data bit spaces of the respective channels,
said means for marking said tape channel data bit spaces comprising means for making the tape markings electrically conductive and electrically connect the channel dots defining a tape data bit space to be marked in accordance with the manual markings of the respective work sheet word data bit areas,
said reader including means for serially sensing said tape word sets in consecutive sequence with continuous movement of said tape through said reader for the length of said tape, said register including means for storing in same, in said consecutive sequence, said word sets for controlling said process through said central processing unit, said sensing means of said reader comprising a pair of electrical contact rows over which said tape passes with such contacts engaging said other side of said tape, with the contacts of said contact rows being spaced for congruency with said spacing of said tape dots of said tape channels and columns, and with said marked tape data bit spaces electrically connecting adjacent pairs of said contacts aligned with the respective tape columns as said tape moves thereover to comprise said reader sensing means.

2. The improvement set forth in claim 1 wherein:

said ribbon also has imprinted on said other side of same, by electrically conductive ink, spaced apart synchronization lines along one side edge of said tape, with said synchronization lines being respectively aligned with and extending longitudinally of said dot columns, said reader sensing means including electrical contact means electrically connected with said contacts for coordinating the sensing of said synchronization lines with the sensing of said tape marked data bit spaces.

3. The improvement set forth in claim 2 wherein:

said reader comprises a housing formed from an electrically insulating material and is shaped to define a slideway through which said tape is passed through the reader, said contacts comprising feeler pins mounted in said housing and having spherically contoured heads spring biased against said tape other side.

4. The improvement set forth in claim 3 wherein:

said ribbon is formed from a polyester material and has a thickness lying in the range of from about 4 mils to about 5 mils.

5. The improvement set forth in claim 4 wherein:

said feeler pins are formed from stainless steel and have a Rockwell hardness lying in the range of from about 60 to about 65, said pins engaging said tape with a pressure of approximately one ounce per pin.

6. In a programmable controller system for controlling an industrial process, with the system including a central processing unit including an access type memory including a binary notation system responsive instruction register, a programming tape, a tape reader for sensing binary notation system computer data bits on the programming tape when passed therethrough and connected to said unit for storing the data bits in said memory register, and means for connecting I/O devices to said unit, the improvement wherein:

said tape comprises a ribbon having imprinted on one side of same a plurality of uniformly spaced dots, with said dots being aligned longitudinally of said tape to define data bit receiving channels in consecutive order transversely of the tape, and said dots being aligned transversely of said tape to form uniformly spaced columns of said dots, said dots being formed by electrically conductive ink, with the spacing of said columns of dots in the respective channels forming the data bit receiving spaces of the respective channels, electrically conductive manual marking means for electrically connecting the tape channel dots across the tape channel data bit receiving spaces for forming computer words binary system fashion longitudinally of and along the respective tape channels, and for marking the ends of such words, to form on the tape one or more sets of such words, said reader including means for serially sensing said tape word sets in consecutive sequence with continuous movement of said tape through said reader for consecutive lengths of said tape, said register including means for storing in same, in said consecutive sequence, said word sets for controlling said process through said central processing unit, said sensing means of said reader comprising a pair of electrical contact rows extending transversely of said direction of movement of said tape through said reader, over which said tape passes with said contacts engaging said one side of said tape, with the contacts of said contact rows being equal in number and spaced in pairs for congruency with said spacing of said tape dots of said tape channels and columns, and with said marked tape data bit spaces electrically connecting the contacts of each pair of said contacts aligned with the respective tape columns as said tape moves thereover to comprise said reader sensing means, said ribbon also having imprinted on said one side of same, by electrically conductive ink, spaced apart synchronization lines along one side edge of said tape, with said synchronization lines being respectively aligned with and extending longitudinally of said dot columns, said reader sensing means including electrical contact means electrically connected with said contacts for coordinating the sensing of said synchronization lines with the sensing of said tape marked data bit spaces, said reader comprising a housing body formed from a self lubricating electrically insulating material and defining a generally planar body, a cover on one side of said body paralleling said body, said body and said cover being formed to define therebetween a planar slideway proportioned to slidably receive, in close fitting relation, said ribbon for passage of said ribbon therethrough, said slideway being dimensioned transversely of said ribbon to substantially complement the transverse dimension of said ribbon for maintaining said tape dots of said tape channels in alignment with those of the respective contacts of the respective contact rows that are to sense the data word of such channels, respectively, a circuit board on the other side of said body, said contacts comprising:

said circuit board being formed to define two rows of contact seats corresponding in location to the positioning of said contacts transversely of the direction of movement of said tape through said reader, said body being formed to define a bore therethrough aligned with each of said contact seats, and a feeler pin slidably mounted in each of said bores and spring biased for movement against said housing cover, said feeler pins each having a sperically contoured contact head directed at said housing cover for engaging said tape one side when the tape is passed through the reader, and means for maintaining said feeler pins in electrical conducting connection with their respective contact seats, with the seats of one of said row of contact seats being electrically connected to a source of electrical energy and with the seats of the other of said row of contact seats being operatively connected to said register storing means, whereby when said tape is passed through said reader said markings of said tape data bit spaces electrically connect the contact heads of the respective pairs of feeler pins aligned with those of said tape channels bearing said markings to comprise said reader sensing means, and whereby insertion of the leading end of said tape into and against said feeler heads cams said feelers away from said reader cover for passage of said tape therebetween.

7. The improvement set forth in claim 6 wherein:

said ribbon is formed from a polyester material and has a thickness lying in the range of from about 4 mils to about 5 mils, with said slideway having a depth on the order of twelve mils.

8. The improvement set forth in claim 6 wherein:

said feeler pins are formed from stainless steel and have a Rockwell hardness lying in the range of from about 60 to about 65, said pins engaging said tape with a pressure of approximately one ounce per pin.

9. The improvement set forth in claim 8 wherein:

said feeler pins are each spring biased by a coil spring interposed between the pin and the contact seat thereof.

10. The improvement set forth in claim 6 wherein:

said reader is free of mechanical means for moving said tape through said slideway, said cover at the tape intake end of said slideway being notched to expose the other side of the tape when applied to said slideway for finger pushing of the tape leading end through said slideway for projecting the tape leading end from the discharge end of said slideway for manual grasping of such tape leading end for manual pulling of the tape through the reader.

11. The improvement set forth in claim 10 wherein;:

said cover is formed from a self lubricating material.

12. The improvement set forth in claim 6 wherein:

said reader is free of mechanical means for moving said tape through said slideway, said reader at the tape intake end of said slideway being notched to expose the tape when applied to said slideway for finger pushing of the tape leading end through said slideway for projecting the tape leading end from the discharge end of said slideway for manual grasping of such tape leading end for manual pulling of the tape through the reader.

13. A tape reader for sensing binary notation system electrically conductive computer data bits on a tape when the tape is passed through the reader for storing the data bits in a computer, with the data bits being in the form of electrically conductive markings on one side of the tape aligned with one or more channels longitudinally of the tape, said reader comprising:

a housing body formed from an electrically insulating material and defining a generally planar body, a cover on one side of said body paralleling said body, said body and said cover being formed to define therebetween a planar slideway proportioned to slidably receive, in close fitting relation, the tape for passage of the tape therethrough, means for serially sensing the data bits in consecutive sequence with continuous movement of said tape through said reader for consecutive lengths of said tape, said sensing means of said reader comprising:

a pair of electrical contact rows extending transversely of said direction of movement of said tape through said reader, over which said tape passes with said contacts engaging said one side of said tape, with the contacts of said contact rows being equal in number and spaced in pairs for congruency with said spacing of the tape channels for electrically connecting the contacts of each pair of said contacts the tape channel markings aligned with same as the tape is moved thereover to comprise said reader sensing means, said slideway being dimensioned transversely of said tape to substantially complement the transverse dimension of said tape for maintaining the tape channels in alignment with those of the respective contacts of the respective contact rows that are to sense the data bits of such channels, respectively, a circuit board on the other side of said body, said contacts comprising:

said circuit board being formed to define two rows of contact seats corresponding in location to the positioning of said contacts transversely of the direction of movement of said tape through said reader, said body being formed to define a bore therethrough aligned with each of said contact seats, and a feeler pin slidably mounted in each of said bores and spring biased for movement against said housing cover, said feeler pins each having a spherically contoured contact head directed at said housing cover for engaging said tape one side when the tape is passed through the reader, and means for maintaining said feeler pins in electrical conducting connection with their respective contact seats, with the seats of one of said row of contact seats being adapted to be electrically connected to a source of electrical energy and with the seats of the other of said row of contact seats being adapted to be operatively connected to the computer, whereby when said tape is passed through said reader said markings electrically connect the contact heads of the respective pairs of feeler pins aligned with those of said tape channels bearing said markings to comprise said reader sensing means, and whereby insertion of the leading end of said tape into and against said feeler heads cams said feeler pins away from said reader cover for passage of said tape therebetween, said reader being free of mechanical means for moving said tape through said slideway, said reader at the tape intake end of said slideway being notched to expose the tape when applied to said slideway for finger pushing of the tape leading end through said slideway for projecting the tape leading end from the discharge end of said slideway for manual grasping of such tape leading end for manual pulling of the tape through the reader.

14. The improvement set forth in claim 13 wherein:
said cover is formed from a self lubricating material.

15. A tape and tape reader arrangement for sensing binary notation system computer data bits on the tape when the tape is passed through the reader for storing the data bits in a computer,
said tape comprising:
a ribbon having imprinted on one side of same a plurality of uniformly spaced dots,
with said dots being aligned longitudinally of said tape to define data bit receiving channels in consecutive order transversely of the tape, and said dots being aligned transversely of said tape to form uniformly spaced columns of said dots,
said dots being formed by electrically conductive ink,
with the spacing of said columns of dots in the respective channels forming the data bit receiving spaces of the respective channels,
electrically conductive manual marking means for electrically connecting the tape channel dots across the tape channel data bit receiving spaces for forming computer words binary system fashion longitudinally of and along the respective tape channels, and for marking the ends of such words, to form on the tape one or more sets of such words,
said reader comprising:
a housing body formed from an electrically insulating material and defining a generally planar body,
a cover on oen side of said body paralleling said body, said body and said cover being formed to define therebetween a planar slideway proportioned to slidably receive, in close fitting relation, said ribbon for passage of said ribbon therethrough,
said reader including means for serially sensing said tape word sets in consecutive sequence on movement of said tape through said reader,
said sensing means of said reader comprising:
a pair of electrical contact rows extending transversely of said direction of movement of said tape through said reader, over which said tape passes with said contacts engaging said one side of said tape,
with the contacts of said contact rows being equal in number and spaced in pairs for congruency with said spacing of said tape dots of said tape channels and columns, and with said marked tape data bit spaces electrically connecting the contacts of each pair of said contacts aligned with the respective tape columns as said tape moves thereover to comprise said reader sensing means,
said slideway being dimensioned transversely of said ribbon to substantially complement the transverse dimension of said ribbon for maintaining said tape dots of said tape channels in alignment with those of the respective contacts of the respective contact rows that are to sense the data words of such channels, respectively,
a circuit board on the other side of said body,
said contacts comprising:
said circuit board being formed to define two rows of contact seats corresponding in location to the positioning of said contacts transversely of the direction of movement of said tape through said reader,
said body being formed to define a bore therethrough aligned with each of said contact seats,
and a feeler pin slidably mounted in each of said bores and spring biased for movement against said housing cover,
said feeler pins each having a spherically contoured contact head directed at said housing cover for engaging said tape one side when the tape is passed through the reader,
and means for maintaining said feeler pins in electrical conducting connection with their respective contact seats,
with the seats of one of said row of contact seats being adapted to be electrically connected to a source of electrical energy and with the seats of the other of said row of contact seats being adapted to be operatively connected to the computer,
whereby when said tape is moved through said reader said markings of said tape data bit spaces electrically connect the contact heads of the respective pairs of feeler pins aligned with those of said tape channels bearing said markings to comprise said reader sensing means,
and whereby insertion of the leading end of said tape into and against said feeler heads cams said feelers away from said reader cover for passage of said tape therebetween.

16. The arrangement set forth in claim 15 wherein:
said ribbon is formed from a polyester material and has a thickness lying in the range of from about 4 mils to about 5 mils,
with said slideway having a depth on the order of twelve mils.

17. The arrangement set forth in claim 16 wherein:
said feeler pins are formed from stainless steel and have a Rockwell hardness lying in the range of from about 60 to about 65.

18. The arrangement set forth in claim 15 wherein:
said ribbon also having imprinted on said one side of same, by electrically conductive ink, spaced apart synchronization lines along one side edge of said tape,
with said synchronization lines being respectively aligned with and extending longitudinally of said dot columns,
said reader sensing means including electrical contact means electrically connected with said contacts for coordinating the sensing of said synchronization lines with the sensing of said tape marked data bit spaces.

19. the arrangement set forth in claim 15 wherein:
said ribbon is formed from clear polyesther material, and said ribbon on said one side of same has a matte coating.

20. In a programmable controller system for controlling an industrial process, with the system including a central processing unit including an access type memory including a binary notation system responsive instruction register, a programming tape, a tape reader for sensing binary notation system computer data bits on the programming tape when passed therethrough and connected to said unit for storing the data bits in said memory register, and means for connection I/O devices to said unit,
the improvement wherein:

said tape comprises a ribbon having imprinted on one side of same a plurality of uniformly spaced dots, with said dots being aligned longitudinally of said tape to define data bit receiving channels in consecutive order transversely of the tape, and said dots being aligned transversely of said tape to form uniformly spaced columns of said dots, said dots being formed by electrically conductive ink, with the spacing of said columns of dots in the respective channels forming the data bit receiving spaces of the respective channels, electrically conductive manual marking means for electrically connecting the tape channel dots across the tape channel data bit receiving spaces for forming computer words binary system fashion longitudinally of and along the respective tape channels, and for marking the ends of such words, to form on the tape one or more sets of such words, said reader including means for serially sensing said tape word sets in consecutive sequence with continuous movement of said tape through said reader for consecutive lengths of said tape, said register including means for storing in same, in said consecutive sequence, said word sets for controlling said process through said central processing unit, said sensing means of said reader comprising a pair of electrical contact rows extending transversely of said direction of movement of said tape through said reader, over which said tape passes with said contacts engaging said one side of said tape, with the contacts of said contact rows being equal in number and spaced in pairs for congruency with said spacing of said tape dots of said tape channels and columns, and with said marked tape data bit spaces electrically connecting the contacts of each pair of said contacts aligned with the respective tape columns as said tape moves thereover to comprise said reader sensing means, said ribbon also having imprinted on said one side of same spaced apart synchronization lines along one side edge of said tape, with said synchronization lines being respectively aligned with and extending longitudinally of said dot columns, said reader sensing means including means for coordinating the sensing of said synchronization lines with the sensing of said tape marked data bit spaces, said reader comprising a housing body formed from a self lubricating electrically insulating material and defining a generally planar body, a cover on one side of said body paralleling said body, said body and said cover being formed to define therebetween a planar slideway proportioned to slidably receive, in close fitting relation, said ribbon for passage of said ribbon therethrough, said slideway being dimensioned transversely of said ribbon to substantially complement the transverse dimension of said ribbon for maintaining said tape dots of said tape channels in alignment with those of the respective contacts of the respective contact rows that are to sense the data word of such channels, respectively, a circuit board on the other side of said body, said contacts comprising:

said circuit board being formed to define two rows of contact seats corresponding in location to the positioning of said contacts transversely of the direction of movement of said tape through said reader, said body being formed to define a bore therethrough aligned with each of said contact seats, and a feeler pin slidably mounted in each of said bores and spring biased for movement against said housing cover, said feeler pins each having a spherically contoured contact head directed at said housing cover for engaging said tape one side when the tape is passed through the reader, and means for maintaining said feeler pins in electrical conducting connection with their respective contact seats, with the seats of one of said row of contact seats being electrically connected to a source of electrical energy and with the seats of the other of said row of contact seats being operatively connected to said register storing means, whereby when said tape is passed through said reader said markings of said tape data bit spaces electrically connect the contact heads of the respective pairs of feeler pins aligned with those of said tape channels bearing said markings to comprise said reader sensing means, and whereby insertion of the leading end of said tape into and against said feeler heads cams said feelers away from said reader cover for passage of said tape therebetween.

21. The improvement set forth in claim 20 wherein:

said reader is free of mechanical means for moving said tape through said slideway, said reader at the tape intake end of said slideway being notched to expose the tape when applied to said slideway for finger pushing of the tape leading end through said slideway for projecting the tape leading end from the discharge end of said slideway for manual grasping of such tape leading end for manual pulling of the tape through the reader.

* * * * *